United States Patent
Bertrand et al.

(12) 
(10) Patent No.: US 6,604,142 B1
(45) Date of Patent: Aug. 5, 2003

(54) METHOD OF FILTERING RESPONSES TO GATEKEEPER DISCOVERY MULTICAST REQUEST MESSAGE

(75) Inventors: Jean-Francois Bertrand, Montreal (CA); Hung Tran, Montreal (CA); Suhail Hasan, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/567,544

(22) Filed: May 5, 2000

(51) Int. Cl.[7] .......................... G06F 15/16; H04L 12/66
(52) U.S. Cl. ..................... 709/227; 709/224; 709/229; 709/203; 370/230; 370/231; 370/235; 370/356
(58) Field of Search ................................. 709/227, 224, 709/229, 203; 370/230, 231, 235, 356

(56) References Cited

U.S. PATENT DOCUMENTS

| | | | |
|---|---|---|---|
| 6,185,288 B1 * | 2/2001 | Wong .......................... | 379/219 |
| 6,331,983 B1 * | 12/2001 | Haggerty et al. ........... | 370/400 |
| 6,424,638 B1 * | 7/2002 | Ray et al. .................... | 370/331 |
| 6,426,945 B1 * | 7/2002 | Sengodan .................... | 370/238 |
| 6,446,108 B1 * | 9/2002 | Rosenberg et al. .......... | 709/203 |
| 6,490,275 B1 * | 12/2002 | Sengodan .................... | 370/356 |
| 6,519,249 B1 * | 2/2003 | Bennefeld et al. .......... | 370/352 |
| 6,526,445 B1 * | 2/2003 | Kumar et al. ................ | 709/227 |
| 6,529,475 B1 * | 3/2003 | Wan et al. .................... | 370/231 |

FOREIGN PATENT DOCUMENTS

EP  0 948 165  10/1999

OTHER PUBLICATIONS

S. Sengodan: A *gatekeeper discovery mechanism for H.323 systems*, Proceedings of SPIE, SPIE—The International Society for Optical Engineering, vol. 3528, Nov. 1998, pp 319–326.

S. Sengodan: *On the use of multicast scope for gatekeeper discovery*, Telecommunication Standardization Sector, APC–1382, Jun. 8–11, 1998.

* cited by examiner

*Primary Examiner*—Krisna Lim
(74) *Attorney, Agent, or Firm*—Smith & Danamraj, PC

(57) ABSTRACT

A method and apparatus for filtering responses to a gatekeeper discovery request message that is multicast from a mobile terminal to a plurality of gatekeepers in a communications network so that an optimum gatekeeper can be selected. When using the H.323 protocol, an enhanced Gatekeeper Request (GRQ) message includes criteria for an optimum gatekeeper for the mobile terminal. Each gatekeeper, upon receiving the enhanced GRQ message, determines whether it meets the criteria in the request message. If so, a confirmation message is sent to the mobile terminal from each gatekeeper that meets the criteria. In an alternative embodiment, gatekeepers that receive the enhanced GRQ message send a response indicating their capabilities to meet each of the criteria. The mobile terminal then determines the optimum gatekeeper by comparing the reported gatekeeper capabilities to the optimum gatekeeper criteria.

22 Claims, 2 Drawing Sheets

METHOD OF FILTERING RESPONSES TO GATEKEEPER DISCOVERY MULTICAST REQUEST MESSAGE

BACKGROUND OF THE INVENTION

1. Technical Field of the Invention

This invention relates to telecommunication systems and, more particularly, to a method of filtering responses to a request message that is multicast from a client to a plurality of servers in a network so that an optimum server can be selected.

2. Description of Related Art

In many types of telecommunications and data networks, various nodes operate in a client-server relationship. Often, when a client needs a server to perform a particular function, the client multicasts a request message to a plurality of servers in the network, and the first server to respond handles the task. In particular, in H.323 Internet Protocol (IP)-based telecommunications networks, a process is performed called the Gatekeeper Discovery process. The H.323 protocol is a multimedia communications protocol developed by the International Telecommunications Union-Telecommunications Standardization Sector (ITU-T). The H.323 protocol describes endpoints and how they interact in a packet-based network.

Endpoints defined by H.323 include, among others, a terminal, a gatekeeper, a gateway, and a multipoint control unit (MCU). The H.323 terminal provides a user with audio communications capabilities and, optionally, video and data communications capabilities. The gatekeeper controls access to a communications network such as a Local Area Network (LAN), and provides address translation (IP-to-telephone number, or IP-to-name, etc.). The gateway provides real-time, two-way communications between H.323 terminals and terminals operating in a circuit-switched network, such as wireline phones operating in the Public Switched Telephone Network (PSTN) or mobile stations operating in the Public Land Mobile Network (PLMN). The MCU provides support for multipoint conference calls.

Today, there is an explosive trend in user mobility along with an associated demand for accessing the same types of services enjoyed by fixed wireline users, and having access to these services regardless of the location of the mobile user. Increasing numbers of mobile users also desire access to data networks such as the Internet, and to services such as Voice-over-IP (VoIP) applications. In H.323 networks, if a mobile user has an IP address of its own, and desires to communicate over an IP-based network with another user whose IP address is also known, the mobile user can point directly to the other user, and does not need a gatekeeper. This mode, however, is very limited in its utility since most mobile terminals do not have a permanently assigned IP address, and the originating user may not know the IP address of the terminating user.

Alternatively, the mobile user can access a gatekeeper to obtain an IP address for himself and for the terminating user so that, for example, a VoIP call can be set up. A problem arises, however, in mobile networks such as the General Packet Radio Service (GPRS) when a mobile user roams into different networks with different gatekeepers. The mobile user needs to discover a gatekeeper that is compatible with his terminal, and that can provide the services he desires with the Quality of Service (QoS) that he needs.

The existing gatekeeper discovery process in H.323 is very limited. When the originating mobile terminal begins the registration process, a discovery message called the Gatekeeper Request (GRQ) message is multicast by the Serving GPRS Service Node (SGSN) to all gatekeepers. Typically, the gatekeeper that is the first one to respond is assigned. The only "filter" in this process is that a gatekeeper will not respond if it does not recognize the mobile terminal. However, just because a gatekeeper is the first one to respond, does not mean it is the best gatekeeper for the user. For example, if a subscriber roams from Montreal to New York and needs to access an IP-based network, it would be more efficient, and the user would get better performance, if he uses a gatekeeper in the New York area. Under current standards, however, the user could get a gatekeeper anywhere in the world unless a specific gatekeeper is hard-coded into the request.

The existing hard-coding procedure uses a Gatekeeper Indentifier in the gatekeeper discovery message. The Gatekeeper Identifier is a BMP String (defined in X.680) that basically includes a name of the gatekeeper to be accessed, an endpoint type of the requesting terminal, and an endpoint alias of the requesting terminal which may be, for example, an e-mail address. By hard coding this information into a terminal's gatekeeper discovery message, it ensures that the same gatekeeper is chosen to serve the mobile terminal each time it requests gatekeeper services. Hard coding, however, does not optimize the selected gatekeeper for a mobile subscriber who roams. This procedure is too simplistic in an environment where a terminal has to dynamically discover a gatekeeper having the proper capabilities, and that is located close enough to provide good performance.

There is no known solution to the disadvantages of the existing gatekeeper discovery procedures. In order to overcome the disadvantages of existing procedures, it would be advantageous to have a method of filtering responses from a plurality of gatekeepers so that an optimum gatekeeper can be selected. Such a method would be applicable not only to the gatekeeper discovery procedure, but also to any procedure in which a request message is multicast from a client to a plurality of servers so that an optimum server can be selected. The present invention provides such a method.

SUMMARY OF THE INVENTION

In one aspect, the present invention is a method of filtering responses to a gatekeeper discovery request message that is multicast from a mobile terminal to a plurality of gatekeepers in a communications network so that an optimum gatekeeper can be selected. When using the H.323 protocol, the Gatekeeper Request (GRQ) message is modified to include criteria for an optimum gatekeeper for the mobile terminal. Each gatekeeper, upon receiving the enhanced GRQ message, determines whether it meets the criteria in the request message. If so, a confirmation message is sent to the mobile terminal from each gatekeeper that meets the criteria.

In an alternative embodiment, gatekeepers that receive the enhanced GRQ message send a response indicating their capabilities to meet each of the criteria. The mobile terminal then determines the optimum gatekeeper by comparing the reported gatekeeper capabilities to the optimum gatekeeper criteria.

The method is also applicable to networks utilizing other protocols such as Session Initiation Protocol (SIP) developed by the Internet Engineering Task Force (IETF), as well as to data networks in general where a client multicasts a request message to a plurality of servers in the network.

In another aspect, the present invention is a gatekeeper that controls access to a communications network and responds to gatekeeper request messages from mobile terminals seeking access to the network. The gatekeeper includes receiving means for receiving a request message from a mobile terminal, the request message including criteria for an optimum gatekeeper. The gatekeeper also includes comparing means for determining whether the gatekeeper meets the criteria in the request message, and transmission means for sending a confirmation message to the mobile terminal upon determining that the gatekeeper meets the criteria.

In yet another aspect, the present invention is a mobile terminal in a radio telecommunications network that communicates with a gatekeeper that controls access to a packet-switched network. The mobile terminal includes means for requesting a service node to multicast a request message to a plurality of gatekeepers. The request message may include criteria for an optimum gatekeeper for the mobile terminal. The mobile terminal also includes receiving means for receiving a plurality of response messages from the gatekeepers. Each of the response messages includes a list of capabilities for the responding gatekeeper. Additionally, the mobile terminal includes means for comparing the received performance capabilities of each responding gatekeeper with the list of criteria for an optimum gatekeeper in order to determine which of the responding gatekeepers best meets the criteria.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
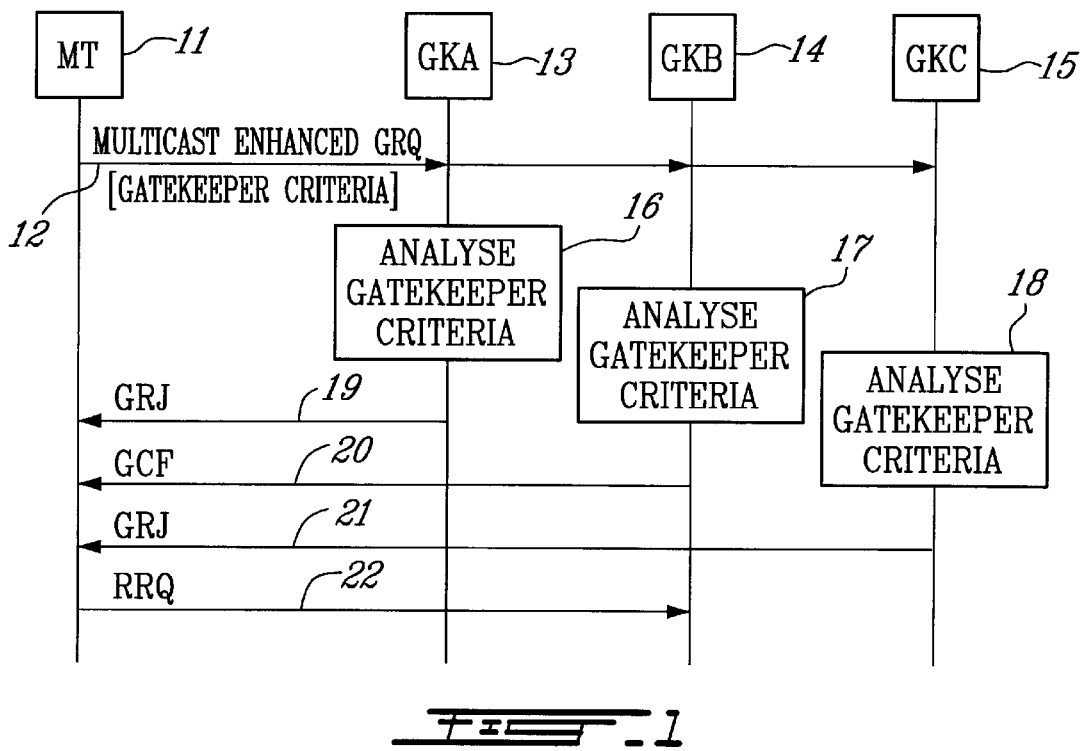
FIG. 1 is a signaling diagram illustrating the flow of messages when a gatekeeper is discovered according to the teachings of a first embodiment of the present invention.

The present invention adds a "filtering" capability to the gatekeeper discovery process through an algorithm that chooses an optimum gatekeeper for the present location and service requirements of a mobile terminal. The invention is described below in terms of an H.323 packet-switched network, but is also applicable to networks utilizing other protocols such as Session Initiation Protocol (SIP) developed by the Internet Engineering Task Force (IETF), as well as to data networks in general where a client multicasts a request message to a plurality of servers in the network.

In a first embodiment, the Gatekeeper Request (GRQ) discovery message is enhanced with a new data field that identifies an optimum gatekeeper. The enhanced GRQ message may optionally include any or all of the following criteria for a responding gatekeeper:

1. Any gatekeeper that recognizes the terminal;
2. A gatekeeper based on its name;
3. A gatekeeper that supports a particular protocol. For example, the user may desire to conduct a conference call, so the gatekeeper must support the protocol (e.g., G.711) utilized by the multipoint control unit (MCU).
4. A gatekeeper from a particular vendor, such as the Ericsson MMTS Gatekeeper. The user may know, for example, that a particular feature is provided by a particular vendor's gatekeeper.
5. A gatekeeper from a particular operator who might operate many gatekeepers, for example, a GPRS operator who provides VoIP services. A particular operator may be offering less expensive services, for example, making it desirable to the user to access one of the operator's gatekeepers.
6. A combination of 1 through 5.

Table 1 below indicates changes made to the H.225.0 signaling specification to reflect the enhancements made to the H.323 Gatekeeper Request message in the present invention.

TABLE 1

| | |
|---|---|
| OperatorIdentifier | ::= BMPString(SIZE(128)) |
| GatekeeperOperator | ::= SEQUENCE |
| { | |
|     operatorIdentifier | OperatorIdentifier, |
|     nonStandardData | NonStandardData OPTIONAL, |
|     ... | |
| } | |
| GatekeeperInfo | ::= SEQUENCE |
| { | |
|     nonStandardData | NonStandardParameter OPTIONAL, |
|     protocol | SEQUENCE OF SupportedProtocols OPTIONAL, |
|     ... | |
| } | |
| GatekeeperRequest | ::=SEQUENCE --(GRQ) |
| { | |
|     requestSeqNum | RequestSeqNum, |
|     protocolIdentifier | ProtocolIdentifier, |
|     nonStandardData | NonStandardParameter OPTIONAL, |
|     rasAddress | TransportAddress, |
|     endpointType | EndpointType, |
|     gatekeeperIdentifier | GatekeeperIdentifier OPTIONAL, |
|     callServices | QseriesOptions OPTIONAL, |
|     endpointAlias | SEQUENCE OF AliasAddress OPTIONAL, |
|     gatekeeperInfo | GatekeeperInfo OPTIONAL, |
|     gatekeeperOperator | GatekeeperOperator OPTIONAL, |
|     gatekeeperVendor | VendorIdentifier OPTIONAL, |
|     ... | |
| } | |
| GatekeeperConfirm | ::=SEQUENCE --(GRQ) |
| { | |
|     requestSeqNum | RequestSeqNum, |
|     protocolIdentifier | ProtocolIdentifier, |
|     nonStandardData | NonStandardParameter OPTIONAL, |
|     gatekeeperIdentifier | GatekeeperIdentifier OPTIONAL, |
|     rasAddress | TransportAddress, |
|     gatekeeperInfo | GatekeeperInfo OPTIONAL, |
|     gatekeeperOperator | GatekeeperOperator OPTIONAL, |
|     gatekeeperVendor | VendorIdentifier OPTIONAL, |
|     ... | |
| } | |

FIG. 1 is a signaling diagram illustrating the flow of messages when a gatekeeper is discovered according to the teachings of the first embodiment of the present invention. The mobile terminal (MT) 11, through an SGSN (not shown), multicasts an enhanced GRQ message 12 to a plurality of gatekeepers, in this case, Gatekeepers A–C (13–15). The enhanced GRQ message includes required gatekeeper criteria which may include performance capabilities, protocols supported, system operator, gatekeeper vendor, etc. When each gatekeeper receives the GRQ message, each gatekeeper determines at steps 16–18 whether it meets the required criteria specified in the enhanced GRQ message. Each gatekeeper answers with either a Gatekeeper Reject (GRJ) message (if it does not meet the criteria) or a Gatekeeper Confirm (GCF) message (if it meets the criteria). In FIG. 1, Gatekeeper A sends a GRJ reject message 19 because, for example, it does not support the requested protocols. Gatekeeper B accepts the request and sends a GCF confirm message 20 because it has the right profile and recognizes the terminal. Gatekeeper C sends a GRJ reject message 21 because, for example, it does not recognize the terminal or it is not from the requested vendor. Therefore, the MT sends a Registration Request (RRQ) message 22 to register with Gatekeeper B.

Table 2 below indicates exemplary gatekeeper criteria that may be placed in the enhanced GRQ message.

TABLE 2

GatekeeperRequest
{
| | |
|---|---|
| requestSeqNum | { 123 }, |
| protocolIdentifier | { itu-t(0) recommendation(0) h(8) h225-0 version(0) 1 }, |
| rasAddress | { TerminalRasAddress }, |
| endpointType | { TerminalEndpointType }, |
| callServices | { TerminalQseriesProtocols }, |
| endpointAlias | { "1-514-123-4567", "VoIPClient" }, |
| gatekeeperInfo | { requestedGKInfo }, |
| gatekeeperOperator | { "myOperator" }, |
| gatekeeperVendor | { "Ericsson", . . . }, |

. . .
}

Figure 2:
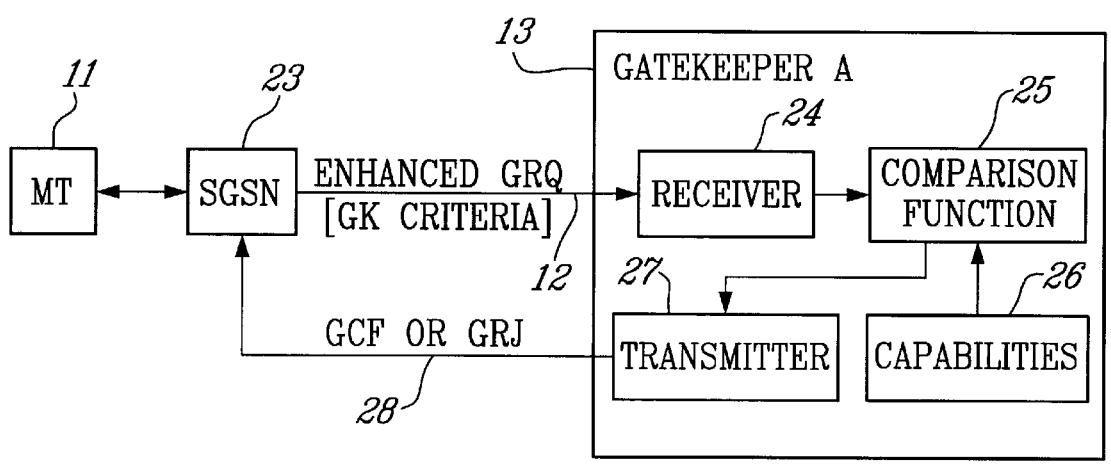
FIG. 2 is a simplified block diagram of a gatekeeper modified in accordance with the teachings of the first embodiment of the present invention.

FIG. 2 is a simplified block diagram of a gatekeeper, such as Gatekeeper A 13 modified in accordance with the teachings of the first embodiment of the present invention. The MT 11 is served by SGSN 23 which multicasts the enhanced GRQ message 12 to Gateway A and other gateways (not shown), and includes the criteria for the optimum gatekeeper for the MT. The enhanced GRQ message is received in a receiving function 24 and is passed to a comparison function 25. The capabilities of the gatekeeper are stored at 26, and are passed to the comparison function for comparison with the gatekeeper criteria. The comparison function determines if the gatekeeper meets the criteria and passes the result to a transmission function 27. If the gatekeeper meets the criteria, a GCF confirm message is sent back to the SGSN at 28. If the gatekeeper does not meet the criteria, a GRJ rejection message is sent to the SGSN.

Figure 3:
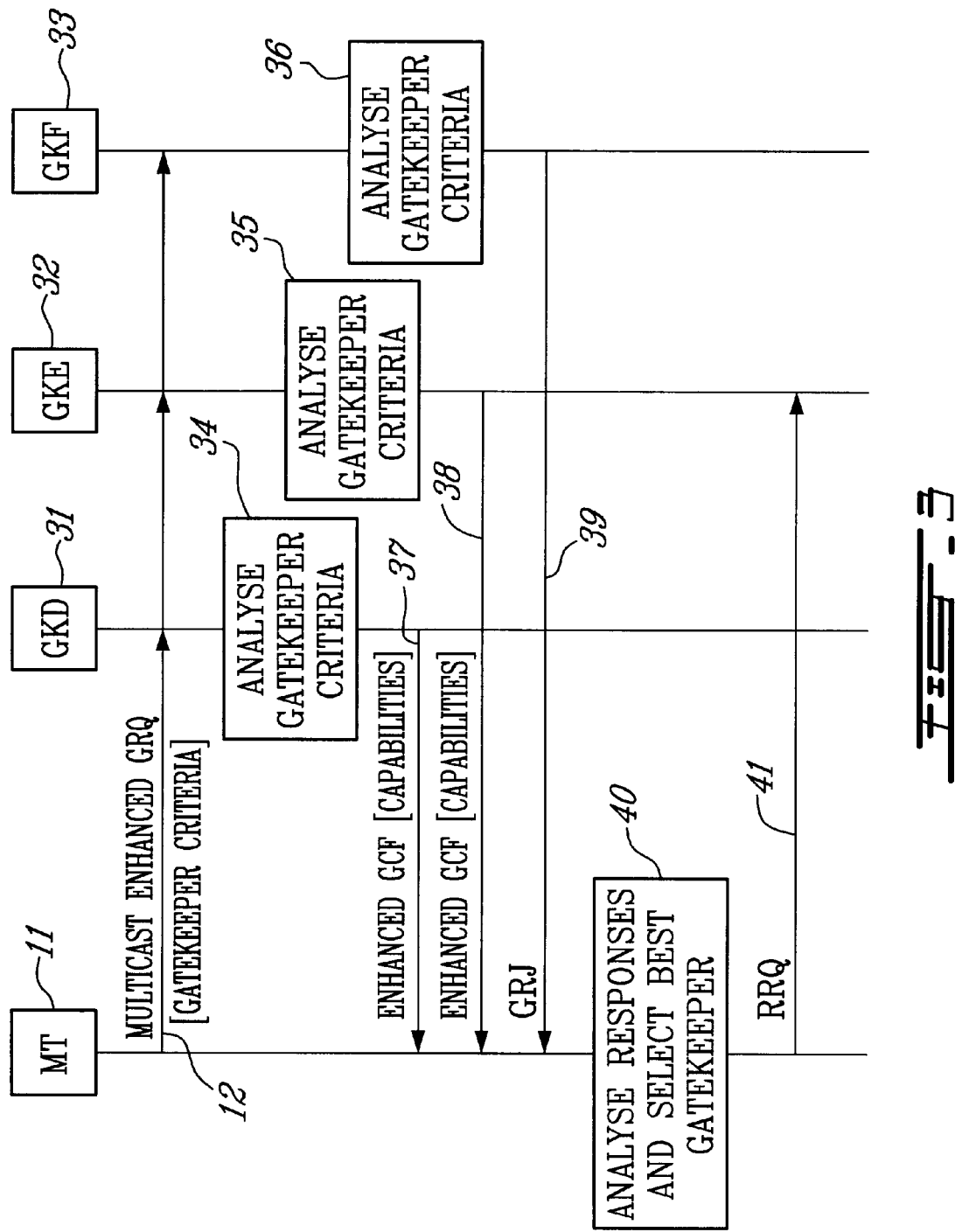
FIG. 3 is a signaling diagram illustrating the flow of messages when a gatekeeper is discovered according to the teachings of a second embodiment of the present invention.

FIG. 3 is a signaling diagram illustrating the flow of messages when a gatekeeper is discovered according to the teachings of the second embodiment of the present invention. Once again, the enhanced GRQ message is multicast to a plurality of gatekeepers, in this case, Gatekeepers D–F (31–33). However, in this embodiment, after the gatekeepers determine whether they meet the required criteria specified in the enhanced GRQ message at steps 34–36, the gatekeepers that recognize the terminal send back an enhanced GCF confirm message that indicates the responding gatekeeper's capabilities and whether or not the gatekeeper meets the criteria that are specified in the enhanced GRQ message. In the example illustrated in FIG. 3, Gatekeeper D 31 and Gatekeeper E 32 send back enhanced GCF messages 37 and 38, respectively. Gatekeeper F 33 does not recognize the terminal, and therefore sends back a GRJ rejection message 39. The terminal gathers all the responses and then determines at step 40 which gatekeeper is the best gatekeeper out of those that responded. The terminal compares the reported gatekeeper capabilities with the selection criteria, and selects the gatekeeper that most closely matches the selection criteria. In this example, it is presumed that Gatekeeper D's response indicated a non-compliant capability such as a different system operator than the one requested, while Gatekeeper E's response had the correct profile. Therefore, the MT sends an RRQ message 41 to register with Gatekeeper E.

Table 3 below indicates exemplary gatekeeper performance capabilities that may be placed in the enhanced GCF message in response to the enhanced GRQ message of Table 2.

TABLE 3

GatekeeperConfirm
{
| | |
|---|---|
| requestSeqNum | { 123 }, |
| protocolIdentifier | { itu-t(0) recommendation(0) h(8) h225-0 version(0) 1 }, |
| gatekeeperIdentifier | { "GKA" }, |
| rasAddress | { GKATransportAddress }, |
| gatekeeperInfo | { requestedGKInfo }, |
| gatekeeperOperator | { "myOperator" }, |
| gatekeeperVendor | { "Ericsson", . . . }, |

. . .
}

Alternatively, the GRQ message may remain as it exists today, and any gatekeeper that recognizes the terminal may respond by reporting a predefined set of its capabilities in an enhanced GCF message. The MT then selects the best gatekeeper based on the capabilities that it needs. If the MT has not requested specific gatekeeper criteria, then predefined gatekeeper criteria may be stored in the MT and utilized to select a gatekeeper.

In order for more than one response to be received, the procedures in the SGSN must be modified. In H.323, a timer is started in the SGSN when the multicast GRQ message is sent. According to existing procedures, when the first GCF confirm message is received, the timer is stopped, and the process moves to the next step of registration. In the present invention, the response timer is modified to continue to run for its entire maximum allowable setting so that multiple GCF confirm messages can be received by the MT. The best response can then be selected.

If multiple gatekeepers meet all of the selection criteria, the MT may select the first to respond since this is the best indication that the gatekeeper can provide the most rapid response time for additional tasking, and thus provide the QoS that the terminal requires. This can be critical in H.323 since many timers are implemented to ensure that responses are received in a timely manner. If the gatekeeper response time is too slow, the terminal may not be able to perform a requested function because the slow response time causes some other timer in the network to time out.

Additional filtering may be performed by indicating that some of the criteria are mandatory while others are optional. In this case, the process may require that only gatekeepers meeting all of the mandatory criteria respond. The response, therefore, would indicate only the optional criteria that the gatekeeper meets, since it is understood that all of the mandatory criteria have to be met in order to respond.

As noted above, the invention has been described in terms of an H.323 packet-switched network, but is also applicable to networks utilizing other protocols such as SIP. Similar information elements can be added to SIP messages for the equivalent SIP server discovery process which also uses a multicast procedure.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A method of filtering responses to a request message that is multicast from a client to a plurality of servers in a network so that an optimum server can be selected, said method comprising the steps of:

including criteria for an optimum server in the multicast request message;

determining in each server that receives the multicast message, whether the server meets the criteria in the request message; and sending a confirmation message to the client from each server that meets the criteria.

2. The method of filtering responses to a multicast request message of claim 1 wherein the client is a mobile terminal in a radio telecommunications network, and the plurality of servers are a plurality of gatekeepers in a packet-switched network, and the method is utilized in a gatekeeper discovery process.

3. The method of filtering responses to a multicast request message of claim 2 wherein the step of including criteria for an optimum server in the multicast request message includes specifying required performance capabilities for the gatekeeper.

4. The method of filtering responses to a multicast request message of claim 2 wherein the step of including criteria for an optimum server in the multicast request message includes specifying required protocols that must be supported by the gatekeeper.

5. The method of filtering responses to a multicast request message of claim 2 wherein the step of including criteria for an optimum server in the multicast request message includes specifying a gatekeeper from a particular network operator.

6. The method of filtering responses to a multicast request message of claim 2 wherein the step of including criteria for an optimum server in the multicast request message includes specifying a gatekeeper from a particular vendor.

7. The method of filtering responses to a multicast request message of claim 1 wherein the step of including criteria for an optimum server in the multicast request message includes specifying at least one mandatory criterion and at least one optional criterion in the request message.

8. The method of filtering responses to a multicast request message of claim 7 wherein the step of determining in each server whether the server meets the criteria in the request message includes determining whether each server meets the mandatory criterion, and the step of sending a confirmation message to the client includes sending a confirmation message to the client only if a server meets the mandatory criterion.

9. The method of filtering responses to a multicast request message of claim 8 wherein the step of sending a confirmation message to the client only if a server meets the mandatory criterion includes sending in the confirmation message an indication of whether the server meets the optional criterion.

10. The method of filtering responses to a multicast request message of claim 1 further comprising sending a rejection message to the client from each server that does not meet the criteria.

11. A method of filtering responses to a request message that is multicast from a client to a plurality of servers in a network so that an optimum server can be selected, said method comprising the steps of:

including criteria for an optimum server in the multicast request message;

determining in each server that receives the multicast message, whether the server meets the criteria in the request message;

sending a confirmation message to the client from each server that recognizes the client, said confirmation message including a list of server capabilities; and determining in the client which of the responding servers is the optimum server.

12. The method of filtering responses to a multicast request message of claim 11 wherein the step of determining in the client which of the responding servers is the optimum server includes comparing the list of server capabilities with the criteria for an optimum server.

13. The method of filtering responses to a multicast request message of claim 12 wherein the step of including criteria for an optimum server in the multicast request message includes specifying at least one mandatory criterion and at least one optional criterion in the request message.

14. The method of filtering responses to a multicast request message of claim 13 wherein the step of sending a confirmation message to the client includes sending a confirmation message to the client only if a server meets the mandatory criterion.

15. The method of filtering responses to a multicast request message of claim 14 wherein the step of sending a confirmation message to the client only if a server meets the mandatory criterion includes sending in the confirmation message an indication of whether the server meets the optional criterion.

16. The method of filtering responses to a multicast request message of claim 15 wherein the step of including criteria for an optimum server in the multicast request message includes specifying a plurality of optional criteria, and the step of determining in the client which of the responding servers is the optimum server includes determining which server meets a maximum number of the specified optional criteria.

17. The method of filtering responses to a multicast request message of claim 12 wherein the step of determining in the client which of the responding servers is the optimum server includes the steps of:

determining whether more than one responding server meets all of the criteria for an optimum server; and selecting from the responding servers meeting all of the criteria, a server that was the first server to respond to the request message.

18. The method of filtering responses to a multicast request message of claim 11 further comprising sending a rejection message to the client from each server that does not meet the criteria.

19. A method of filtering responses to a request message that is multicast from a client to a plurality of servers in a network so that an optimum server can be selected, said method comprising the steps of:

storing in the client, predefined criteria for an optimum server;

multicasting the request message from the client to the plurality of servers;

sending a confirmation message to the client from each server that recognizes the client, said confirmation message including a list of server capabilities; and determining in the client which of the responding servers is the optimum server by comparing the list of server capabilities received from each server with the predefined criteria for an optimum server.

20. A gatekeeper that controls access to a communications network and responds to gatekeeper request messages from mobile terminals seeking access to the network, said gatekeeper comprising:

receiving means for receiving a request message from a mobile terminal, said request message including criteria for an optimum gatekeeper;

comparing means for determining whether the gatekeeper meets the criteria in the request message; and transmission means for sending a confirmation message to the mobile terminal upon determining that the gatekeeper meets the criteria.

21. The gatekeeper of claim 20 wherein the transmission means also includes means for sending a rejection message to the mobile terminal upon determining that the gatekeeper does not meet the criteria.

22. A mobile terminal in a radio telecommunications network that communicates with a gatekeeper that controls access to a packet-switched network, said mobile terminal comprising:

means for requesting a service node to multicast a gatekeeper discovery message to a plurality of gatekeepers;

means for receiving a plurality of response messages from the gatekeepers, said response messages including performance capabilities of each responding gatekeeper;

a list of criteria for an optimum gatekeeper for the mobile terminal; and means for comparing the received performance capabilities of each responding gatekeeper with the list of criteria for an optimum gatekeeper in order to determine which of the responding gatekeepers best meets the criteria.

* * * * *